United States Patent [19]

Twerdochlib

[11] Patent Number: 4,875,373
[45] Date of Patent: Oct. 24, 1989

[54] TEMPERATURE COMPENSATED FIBER OPTIC VIBRATION SENSOR

[75] Inventor: Michael Twerdochlib, Oviedo, Fla.

[73] Assignee: Westinghouse Electric Corp., Pittsburgh, Pa.

[21] Appl. No.: 223,307

[22] Filed: Jul. 25, 1988

[51] Int. Cl.⁴ .............................................. G01D 5/34
[52] U.S. Cl. .................................. 73/655; 250/231 R; 350/162.24
[58] Field of Search ............ 73/651, 653, 655, 517 R, 73/DIG. 11; 250/231 R, 237 G; 350/162.24

[56] References Cited

U.S. PATENT DOCUMENTS

| | | | |
|---|---|---|---|
| 2,728,220 | 12/1955 | Willner | 73/655 |
| 3,364,813 | 1/1968 | McKinney | 73/655 |
| 4,218,614 | 8/1980 | Millner | 73/655 |
| 4,321,464 | 3/1982 | Millner | 73/655 |

FOREIGN PATENT DOCUMENTS 0681376 8/1979 U.S.S.R. ............................ 73/517 R

Primary Examiner—Tom Noland
Assistant Examiner—Lawrence G. Fess
Attorney, Agent, or Firm—K. Bach

[57] ABSTRACT

A light beam altering grid (20), having a graded slit density pattern (22), is mounted on a temperature responsive support structure (23) to traverse a light beam (28). The slit density (slit per unit length) of the grid (20) is greater at one end of the grid (20) and gradually reduces towards the opposite end of the grid (20). The grid (20) is disposed on a thermally responsive support (23) such as a bimetallic cantilever (23). The thermally responsive support (23) operates to bend by an amount dependent upon the temperature of the environment in which it operates. In this manner, the grid (20) disposed on the thermally responsive support (23) is positioned in dependence upon the environmental temperature. The grid (20) may be arranged, for example, such that at higher environmental temperatures, when the natural frequency of the support (23) is reduced, the grid (20) will be positioned such that the change in density of slit graduations intersecting the light beam (28) compensates for change in the vibration amplification factor of the bimetalic cantilever (23) caused by the elevated environmental temperature.

13 Claims, 1 Drawing Sheet

TEMPERATURE COMPENSATED FIBER OPTIC VIBRATION SENSOR

BACKGROUND OF THE INVENTION

1. Field of the Invention

The present invention is directed to an improved optical vibration monitor, wherein a light beam is intersected by a light-modifying grid which is mounted so as to oscillate, with respect to the light beam, in response to environmental vibrations.

2. Description of the Related Art

Optical vibration monitors are generally known to be extremely useful, especially in high-electromagnetic environments where traditional vibration sensors, which employ electromagnetic sensing means, would be impractical (i.e., in measuring on-line 120 Hz stator winding end-turn vibrations). Conventional optical vibration sensors employ a grid mounted on the free end of a reed support structure. The grid is generally composed of an opaque plate having a plurality of evenly spaced slits therein through which light may pass. In these arrangements, upon occurrence of environmental vibrations, the reed will vibrate causing the grid to oscillate such that the light normally passing through the spaced slits is periodically interrupted by opaque portions of the opaque plate. A light receiver and suitable evaluation circuitry receive the periodically interrupted light passing through the grid slits, and evaluates the signal, for instance, by comparing the number of light interruptions occurring per cycle of vibration with a threshold value. In this manner, the amplitude of oscillation which the grid experiences, and thus the amplitude of environmental vibration sensed, may be monitored.

However, a problem exists in conventional optical vibration sensors in that the oscillation amplitudes of the grid are dependent on the temperature responsive vibration properties of the reed on which the grid is mounted. Environmental vibrations (i.e., on-line 120 Hz stator winding end-turn vibrations) cause the reed and thus the grid, to oscillate at substantially the same frequency as that of the environmental vibrations (i.e., 120 Hz). The amplitude of the reed vibration in these systems is dependent upon the amplitude of the environmental vibrations, and the difference between the natural frequency of the reed and the frequency of the environmental vibrations. However, an increase in temperature causes the reed's natural frequency to decrease, thereby changing the difference between the natural frequency of the reed and the frequency of the vibration to be sensed. The smaller this difference, the higher will be the vibration amplitude amplification produced by the reed. Thus, if the reed's natural frequency is set to a value above the frequency of the vibration to be sensed, an increase in temperature will result in an increase in amplification factor. In this case, conventional optical vibration sensors will generally produce more light pulses per cycle of grid oscillations at higher temperatures than at lower temperatures for the same degree of environmental vibration. Thus, the accuracy of conventional optical vibration sensors suffers greatly in environments exhibiting temperature variations of any significant degree. By way of example, a conventional optical vibration sensor can employ a reed tuned to 132 Hz to produce an 8× amplification of the 120 Hz stator winding end-turn vibrations and can have a temperature dependence of as high as 36 percent over a temperature range of 20°-100° C. (this is about a 0.45 percent per degree temperature dependence).

SUMMARY OF THE INVENTION

It is, therefore, an object of the present invention to provide an improved optical vibration sensor which exhibits improved accuracy over a range of temperatures.

It is further an object of the present invention to provide an improved optical vibration sensor which exhibits improved accuracy in a temperature varying environment.

It is yet another object of the present invention to provide a system for modifying conventional optical vibration sensors so as to demonstrate improved accuracy in a temperature varying environment.

These objects, and others, are accomplished, according to an embodiment of the present invention, by the use of a novel light beam altering grid having a graded slit density and a temperature responsive support structure. The slit density (slits per unit length) of the grid is greater at one end of the grid and gradually reducing towards the opposite end of the grid. The grid is disposed on a thermally responsive support, such as a bimetallic cantilever. The thermally responsive support operates to bend by an amount dependent upon the temperature of the environment in which it operates. In this manner, the grid disposed on the thermally responsive support is positioned in dependence upon the environmental temperature. For example, the grid may be arranged such that at higher environmental temperatures, when the natural frequency of the support is reduced, the grid will be positioned such that the change in density of slit graduations intersecting the light beam compensates for change in the amplification factor caused by the elevated environmental temperature.

Since the lower slit density would normally effect a lower number of light interruptions per cycle of oscillation, while the higher slit density would normally effect a higher number of light interruptions per cycle of oscillation, the relative gain or loss of light interruptions per cycle caused by the relative gain or loss of amplitudes of oscillation is compensated by relative decreases and increases, respectively, of the number of slits traversing the light beam. Furthermore, such compensation is automatic upon replacing the grid and support of a conventional sensor with that of the present invention, in that the compensation occurs solely within the grid and the support (e.g., no modification of electronic circuitry is necessary).

BRIEF DESCRIPTION OF THE DRAWINGS

These and other objects, features and advantages of the invention will become more apparent upon reading of the following detailed description and drawings, in which.

DESCRIPTION OF THE PREFERRED EMBODIMENTS

Figure 1:
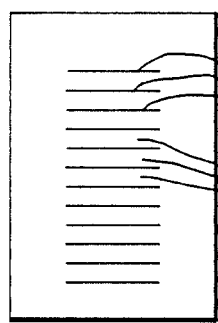
FIG. 1 is an illustration of the prior art uniform density grid pattern.

In the drawings, FIG. 1 illustrates a uniform density grid pattern employed in conventional optical vibration sensors. The grid 10, shown in FIG. 1, includes an opaque plate 12 having a plurality of evenly spaced slits 11 therein. Since the slits 11 are evenly spaced, the grid 10 exhibits a uniform slit density having a zero slit density gradient. That is, the number of slits per unit length of the grid is uniform and the spacings between adjacent slits is equal (zero change) throughout the entire length of the grid.

In a conventional fiber optic vibration sensor, a light beam emanating from an optical fiber (not shown) intersects grid 10 before being received by suitable light receiving and evaluating circuitry (not shown). The grid 10 is mounted to oscillate on a reed support (not shown) in response to environmental vibrations. Upon oscillation of the grid 10, the light beam is periodically traversed both by opaque portions 12 and slits 11 of the grid 10. In this manner, the light passing through the grid 10 and received by the suitable circuitry is in the form of a pulsed-light signal. Furthermore, the pulsed-light signal for each cycle of oscillation of the grid (each cycle being composed of one upswing and one downswing), the grid oscillation frequency being constant, can be evaluated in the evaluation circuitry to determine the amplitude of oscillation. That is, as the amplitude of oscillation increases, the number of slits 11 and opaque portions 12 of the grid 10 traversing the light beam per cycle of oscillation increases. On the other hand, as the amplitude of oscillation decreases, then the number of slits 11 and opaque portions 12 of the grid 10 traversing the light beam 28 per cycle decreases. The frequency of the environmental vibrations can be used as a time reference (i.e., a time period measure of each cycle) for a pulse count within the evaluation circuitry. The light signal receiving and evaluation circuitry is well known in the art of fiber optic vibration sensors. The details of such circuitry are not discussed herein, as the novelty of the present invention is not considered to lie within such circuitry.

As previously described, a problem occurs in conventional optical vibration sensors (including conventional fiber optic vibration sensors) in that the reed on which the grid 10 is mounted exhibits changes in vibrational qualities in dependence upon changes in environmental temperature. That is, if the amplitude of the vibration being sensed is constant, the amplitude of grid oscillations and thus the number of light pulses per cycle of oscillation in conventional optical vibration sensors changes as the environmental temperature changes. Since the amplitude of the swings of the grid per cycle of oscillation determines the number of pulses received by the evaluation circuitry per cycle, it will be apparent that the changes in the amplitude of the swings due to environmental temperature changes, rather than changes in the amplitude of the environmental vibrations, seriously and adversely affects the reliability of such sensors to accurately monitor environmental vibrations.

Figure 2:
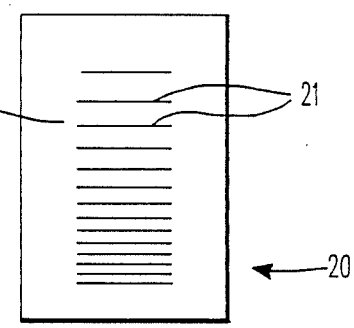
FIG. 2 is an illustration of a graded density grid pattern according to an embodiment of the present invention.

The present invention operates to compensate for the varying amplitudes of swings of the grid occurring at varying temperatures. According to an embodiment of the present invention, a grid 20 having a graded slit density pattern 22, as that shown in FIG. 2, is employed instead of the grid 10 having a uniform density pattern with a zero slit density gradient, as that shown in FIG. 1. In the embodiment shown in FIG. 2, the grid 20 has a "constant" and linear slit density gradient. That is, in the graded slit density pattern of FIG. 2, the slits 21 are not spaced apart by equal distances, but rather, are spaced at increasingly larger distances as one looks from the bottom to the top of the grid in FIG. 2. The slit separations increase linearly from the bottom to the top of the grid in FIG. 2 according to the following equalities:

$D_1 = L$ $D_2 = L + L$ $D_3 = L + 2L$ $D_4 = L + 3L$, etc.

Where the distance between the bottom two slits in FIG. 2 is represented by $D_1$. The distance between the third slit from the bottom and the second slit from the bottom of the grid in FIG. 2 is represented by $D_2$. The distance between the fourth slit from the bottom and the third slit from the bottom of the grid in FIG. 2 is represented by $D_3$. The distance between the fifth slit from the bottom and the fourth slit from the bottom is represented by $D_4$. The distances between the remaining adjacent pairs of slits in the grid of FIG. 2 increase similarly (by 1 L per adjacent pair) from the bottom to the top of the grid. As described below, this linear increase in slit separations from the bottom to the top of the grid of FIG. 2 corresponds with a grid mounting structure (i.e., the bimetallic cantilever structure described below) which exhibits a linear temperature dependence. It will be recognized, however, that a grid having a nonlinear slit separation gradient may be employed with a grid mounting structure that exhibits nonlinear temperature dependencies.

Figure 3:
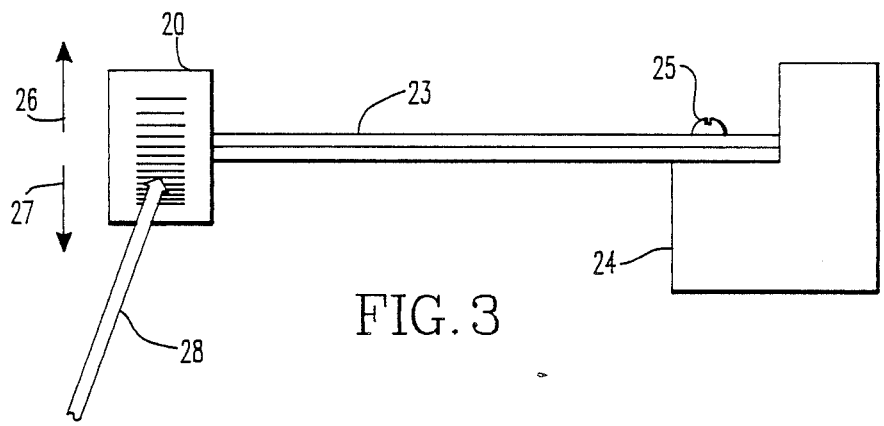
FIG. 3 shows a grid disposed on a thermally responsive mount at a relatively-low environmental temperature (i.e., 20° C.)
Figure 4:
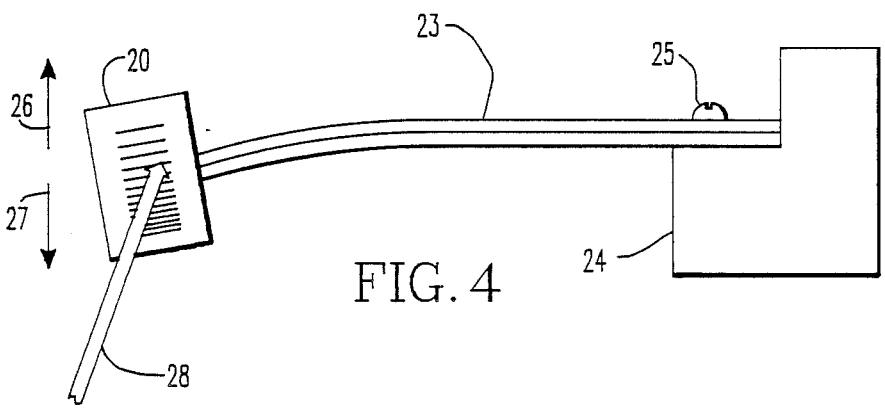
FIG. 4 shows a grid disposed on a thermally responsive mount at a higher environmental temperature (i.e., 50° C.).

In the embodiment shown in FIGS. 3 and 4, the grid 20 is disposed at one end of a support structure and is free to oscillate in the direction of the arrows 26 and 27 in response to environmental vibrations. The support structure includes a bimetallic cantilever 23, a cantilever support 24, and a screw 25 for attaching the cantilever to cantilever support 24. Support 24 is fixed to the source of vibrations to be sensed. In this manner, sensed vibrations are transmitted to the bimetallic cantilever 23, causing the bimetallic cantilever to vibrate, and thus causing the grid 20 to oscillate in the direction of arrows 26 and 27. Also shown in FIGS. 3 and 4 is a light beam 28, which emanates from any suitable source (such as an optical fiber, as in a fiber optic vibration sensor), and which impinges upon the grid 20.

The embodiment shown as FIGS. 3 and 4 is one in which the vibration amplification produced by the bimetallic cantilever 23 increases with temperature. Furthermore, the bimetallic cantilever 23, in the embodiments of FIGS. 3 and 4, is temperature responsive, in that as the environmental temperature increases, the bimetallic cantilever 23 is caused to bend downward with respect to FIGS. 3 and 4. The bimetallic cantilever 23 in the embodiment of FIGS. 3 and 4 exhibits a linear temperature dependence according to the following equality.

$$X = KT$$

Where X represents the position of the grid mounting end of the bimetallic cantilever 23 relative to its rest position at some fixed temperature such as 0° C. or 20° C., K represents the temperature dependent bending constant inherent in the bimetallic structure of the cantilever 23, and T represents the temperature.

Disposed at the free end of the bimetallic cantilever 23 is the grid 20 having the constant slit density gradient described above. As shown in FIGS. 3 and 4, grid 20 is arranged such that the slits 21 which are spaced apart by greater distances are located at the top, while the slits 21 which are spaced apart by lesser distances are located near the bottom of the grid, with respect to FIGS. 3 and 4. In this manner, a net lower density of slits 21 occurs on the upper portion of the grid 20, while a net higher density of slits 21 occurs on the lower portion of the grid 20.

As shown in FIG. 3, the bimetallic cantilever 23 is relatively unbent, thus, exhibiting the condition of a relatively low environmental temperature (i.e., 20° C.). At this temperature, the bimetallic cantilever 23, being relatively straight, positions the grid 20 such that the light beam 28 impinges on the slits 21 which are located along the lower portion of grid 20. Upon occurrence of environmental vibrations, the grid 20 is caused to freely swing in an oscillatory manner in the direction of arrows 26 and 27. Such oscillation creates a pulsed light signal, the number of pulses per cycle of oscillation (one cycle is one swing in each direction 26 and 27) being dependent upon the amplitude of the swings per cycle and the density of slits 21 which intersect the light beam during oscillation. The pulsed light signal produced by the graded slit density pattern (of FIG. 2) differs from that produced by the uniform slit density pattern of the prior art grids (FIG. 1) in that upon swings in the direction of arrow 27, the graded slit density pattern produces fewer pulses than the uniform slit density pattern grid, while upon swings in the direction of arrow 26, the graded slit density pattern produces more pulses than a uniform slit density pattern. This occurs because the graded slit density pattern has fewer slits per length of grid which pass the light beam 28 on swings of the grid in the direction of arrow 27 than the uniform slit density pattern. Moreover, the graded slit density pattern has more slits per length of grid passing the light beam 28 on swings of the grid in the direction of arrow 26 than the uniform slit density pattern.

It should be noted however that the use of a graded slit density pattern grid having a constant slit gradient does not effect the light signal receiving and evaluation circuitry. This circuitry, as previously described, responds to the total number of light pulses per cycle of oscillation (per one swing in the direction of arrow 26 and one swing in the direction of arrow 27). Thus, while the evaluation circuitry may receive fewer pulses from the graded slit pattern grid swinging in the direction of arrow 27, the circuitry receives a greater number of pulses from the graded slit pattern grid swinging in the direction of arrow 26 than such circuitry would receive with a uniform slit density pattern grid. That is, the deficiency in the number of pulses occurring during swings in the direction of arrow 27 is compensated by the excess in the number of pulses occurring during swings in the direction of arrow 26. In this manner, the total number of light pulses per cycle of oscillation received by the evaluation circuitry remains the same whether a uniform slit density pattern grid or a graded slit pattern grid having a constant slit gradient is employed. Therefore, a conventional optical vibration sensor can be modified to be less temperature dependent, according to an embodiment of the present invention, merely by replacing the uniform slit density pattern grid and reed support with the graded slit density pattern grid having a constant slit gradient and a temperature responsive support. No replacement of circuitry would be required for such modification.

As shown in FIG. 4, the bimetallic cantilever 23 is slightly bent, thus, exhibiting the condition of a relatively higher environmental temperature (i.e., 50° C.) than that exhibited in FIG. 3. As the environmental temperature rises, the bimetallic cantilever 23 bends, causing the grid 20 to drop slightly (with respect to FIG. 4), thereby causing the light beam 28 to impinge on, for example, a net lower average slit density region of the grid. Thus, due to the reduced number of slits per length of the grid in this region, environmental vibrations causing oscillations of the grid 20 would normally produce a reduced number of light pulses per cycle of oscillation than would the uniform density grid pattern under the same environmental vibrations. The reduced number of light pulses thus produced, however, is employed, in this example, to compensate for the natural increase in the number of such pulses occurring at higher environmental temperatures due to the natural increase in amplitudes of grid oscillation.

As previously described, increases in environmental temperature cause the natural frequency of the grid support (i.e., the reed or the bimetallic cantilever 23) to decrease, thus causing, for example, higher amplitude oscillations (when such decrease in the natural frequency of the grid support effects a decrease in the difference between this natural frequency and the frequency of environmental vibrations) in response to environmental vibrations. According to the embodiments of the present invention described above (in connection with FIGS. 3 and 4), however, the relative decrease (with respect to the uniform density grid pattern) in the number of light pulses per cycle of oscillation produced with the graded slit density pattern grid at higher environmental temperatures compensates for the increase in counts which occurs due to the above-described higher amplitude of oscillation at such higher environmental temperatures.

The overall effect is that the graded slit density pattern grid and the bimetallic cantilever, of the embodiments of FIGS. 3 and 4, operate together to compensate for what would normally be a change in the number of light pulses per cycle of oscillation, due to natural changes in the vibration amplitude of the reed, upon changes in the environmental temperature. The higher the environmental temperature, the greater the bend in the bimetallic cantilever, and thus the lower the net average slit density area of the grid 20 which traverses the light beam 28.

Other embodiments of the present invention may include a cantilever which is not entirely bimetallic, in that it is provided with a bimetallic structure only over a portion or portions of the length thereof. Furthermore, other temperature-dependent mounting and grid positioning structures may be employed and are considered to be within the scope of the present invention.

Moreover, while the temperature effects on temperature-dependent materials may exhibit linear effects making it practical to employ a slit pattern having a constant slit density gradient, it is also within the scope of the present invention to employ temperature-dependent materials which do not exhibit such linear effects to temperature changes. For example, a reed exhibiting a nonlinear temperature dependency (e.g., $X=K\sqrt{T}$, $X=KT^2$, etc.) may be employed. In such embodiments, a slit pattern having a slit density gradient which is not constant may be practical.

Furthermore, while the embodiments described thus far include grids of open slits through which light may pass, it is also considered to be within the scope of the present invention to employ light reflective strips in place of the slits. In this manner, a receiver of the pulsed-light signals will receive such signals as reflections from the reflective strips. Additionally, other individual light-altering means may be used in place of individual slits without detracting from the scope of the present invention.

While the description above shows particular embodiments of the present invention, it will be understood that many modifications may be made without departing from the spirit thereof. The pending claims are intended to cover such modifications as would fall within the true scope and spirit of the present invention.

What is claimed is:

1. An optical vibration monitor operable with a light beam, said optical vibration monitor comprising:
    a grid operable to intersect the light beam, said grid having a first edge, a second edge, and a plurality of light-modifying means, for modifying the light beam, disposed between said first edge and said second edge, said light-modifying means being arranged at gradationally increasing densities from said first edge to said second edge;
    a support supporting said grid for oscillatory motion in the path of the light beam, said support being vibratory in response to environmental vibrations applied thereto, said support being constructed to transmit vibrations applied thereto to said grid with an amplification factor which varies with environmental temperature;
    whereby, upon vibration of said support, said grid oscillates with respect to said light beam causing a number of said plurality of light-modifying means arranged on said grid to intersect said light beam per cycle of grid oscillation, the number of light-modifying means which intersect said light beam per cycle of grid oscillation being dependent upon the amplitude of grid oscillation per cycle and the density of light-modifying means which intersect said light beam per cycle of grid oscillation; and
    wherein said support includes a temperature responsive positioning means for positioning said grid transverse to the light beam as a function of environmental temperature such that said light-modifying means which intersect the light beam during grid oscillations have a density which compensates for the variance in amplitude of oscillation of said grid caused by said varying environmental temperatures.

2. An optical vibration monitor as claimed in claim 1, wherein said support has a characteristic natural frequency and wherein said support is vibratory at an amplitude which is dependent upon the difference between the frequency of environmental vibrations and said characteristic natural frequency.

3. An optical vibration monitor as claimed in claim 1, wherein said support has a characteristic natural frequency, and wherein the amplification factor of the vibrations transmitted to said grid is dependent upon the difference between the frequency of environmental vibrations and said characteristic natural frequency.

4. An optical vibration monitor as claimed in claim wherein said grid having a plurality of light-modifying means comprises an opaque plate having a plurality of slits therein through which light may pass.

5. An optical vibration monitor as claimed in claim 4, wherein said temperature responsive positioning means comprises a bimetallic cantilever.

6. An optical vibration monitor as claimed in claim 4, wherein said plurality of slits are provided in a constant density gradient pattern.

7. An optical vibration monitor as claimed in claim 1, wherein said temperature responsive positioning means comprises a bimetallic cantilever.

8. An optical vibration monitor as claimed in claim 1, wherein said plurality of light-modifying means are provided in a constant density gradient pattern.

9. A method of monitoring environmental vibrations independent of a variance in the environmental temperature, said method comprising the steps of:
    supporting a grid having a graded density pattern of light-modifying means, with a portion of said graded density pattern of light-modifying means intersecting the path of a light beam;
    oscillating said grid at amplitudes dependent upon amplitudes of environmental vibrations and the environmental temperature;
    whereby, upon oscillation of said grid, a number of said light-modifying means intersects the path of the light beam per cycle of oscillation, the number of light-modifying means which intersect the path of the light beam per cycle of oscillation being dependent upon the amplitude of oscillation per cycle and the density of light-modifying means which intersect the path of the light beam per cycle of oscillation; and
    varying the number of light-modifying means which intersect the path of the light beam per cycle of oscillation, by varying the density of said light-modifying means which intersect the light beam per cycle of oscillation, by an amount which compensates for the variance in the number of light-modifying means which intersect the light beam due to the variance in the amplitude of oscillation caused by an environmental temperature variance.

10. In a vibration sensor of the type which includes a grid supported on a support structure for oscillatory motion in the path of a light beam, the improvement wherein:
    said support structure comprises a temperature responsive positioning means operable to position said grid with respect to the path of the light beam in dependence upon the temperature; and
    said sensor comprises a graded density pattern of light modification means disposed on said grid.

11. A vibration sensor as claimed in claim 10, wherein said temperature responsive positioning means comprises a bimetallic cantilever which vibrates at an amplitude dependent on the amplitude of vibrations being sensed and upon the temperature.

12. A vibration sensor as claimed in claim 11, wherein said graded density pattern of light modification means comprises a plurality of light modification means arranged in a constant density gradient pattern.

13. A vibration sensor as claimed in claim 11 wherein said graded density pattern of light modification means comprises an opaque plate having a graded density pattern of slits therein through which light may pass.

* * * * *